United States Patent Office 3,513,030
Patented May 19, 1970

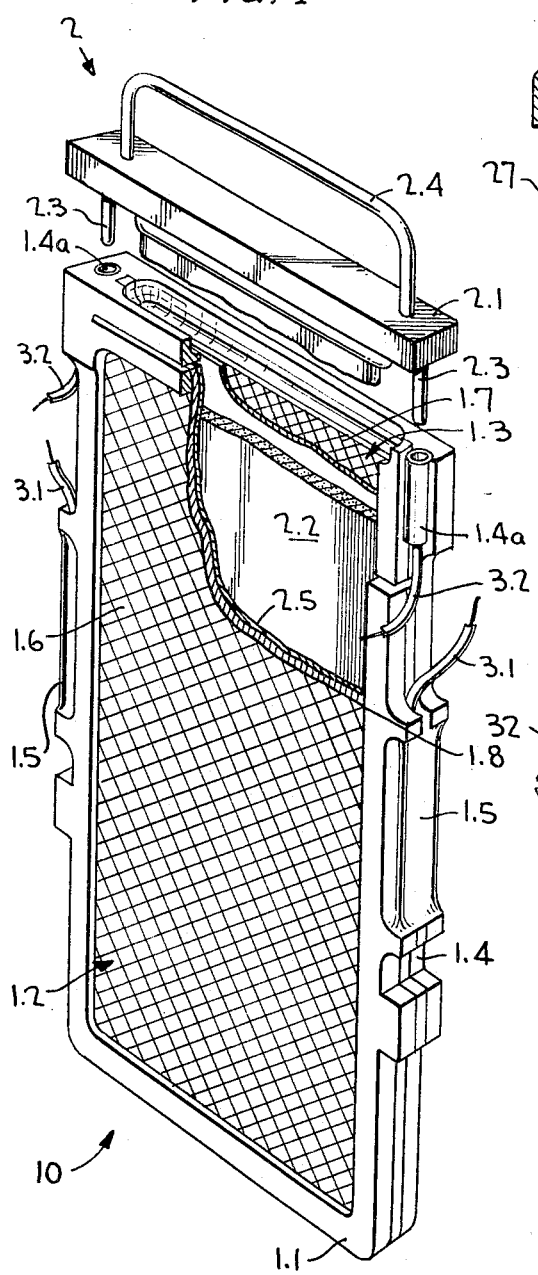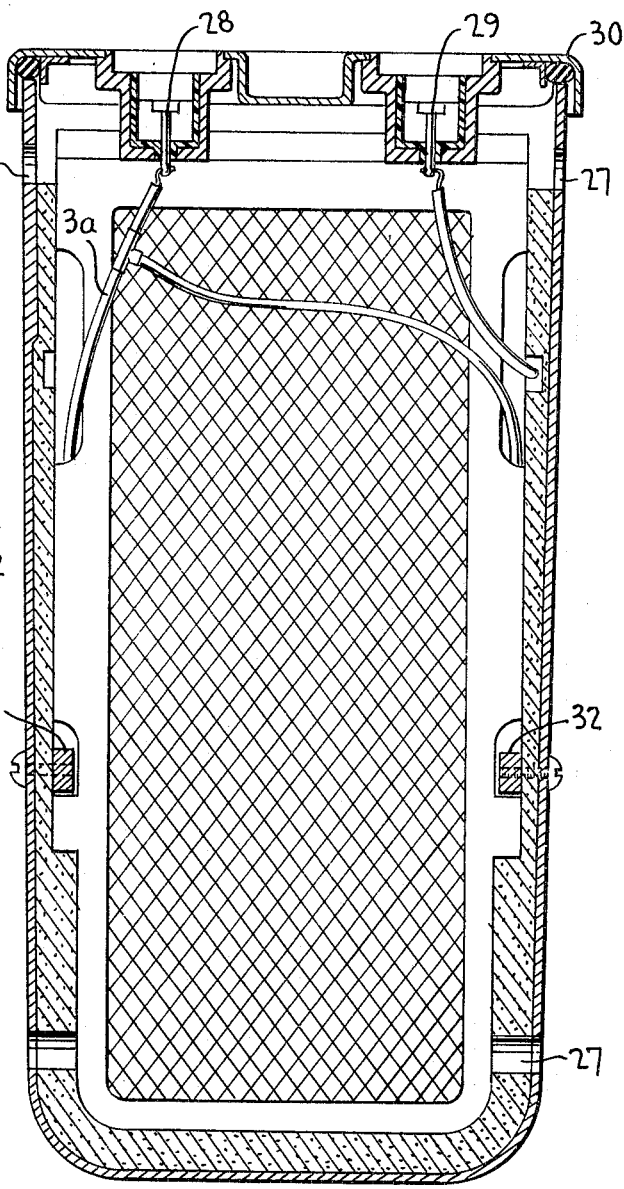

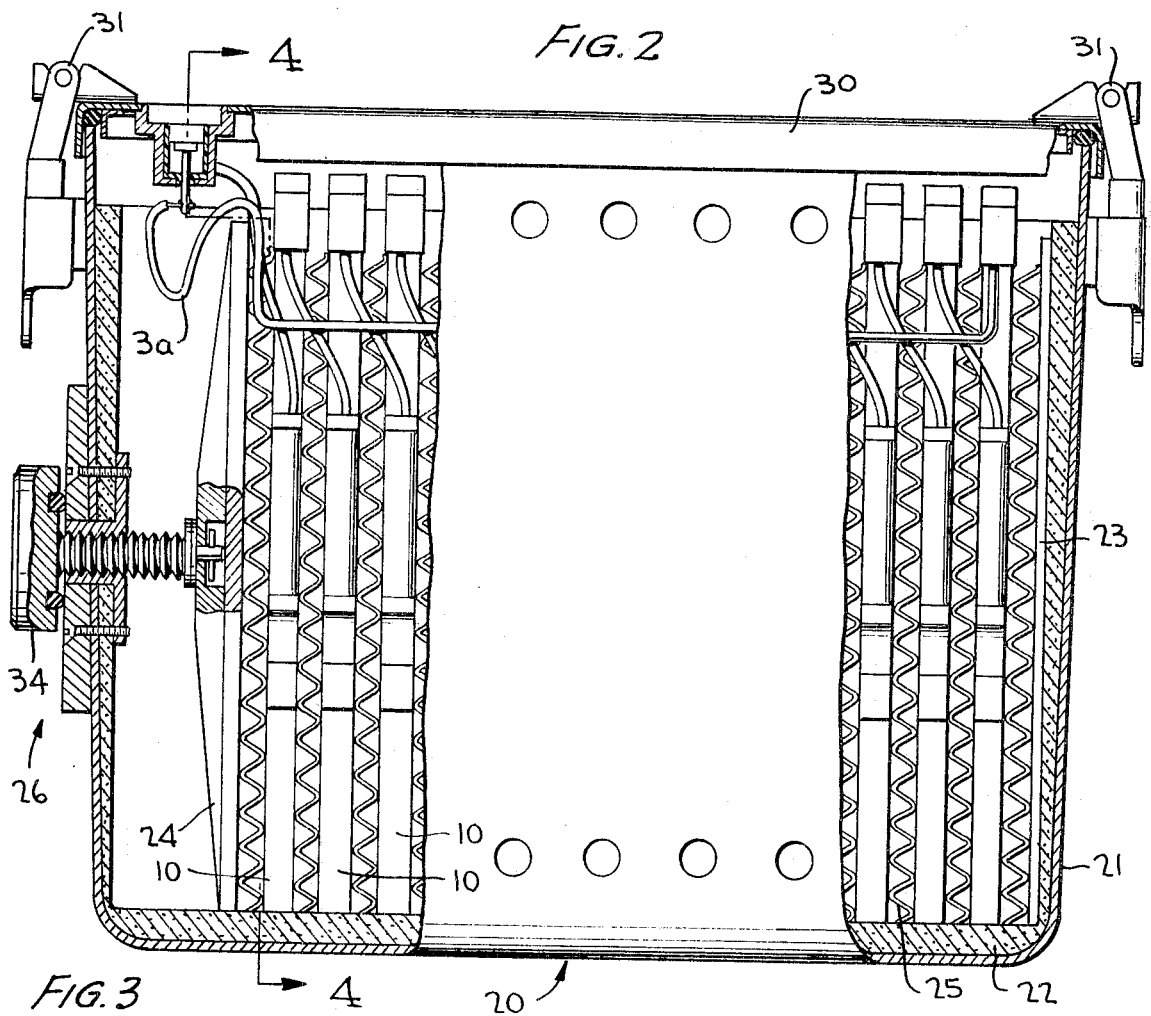
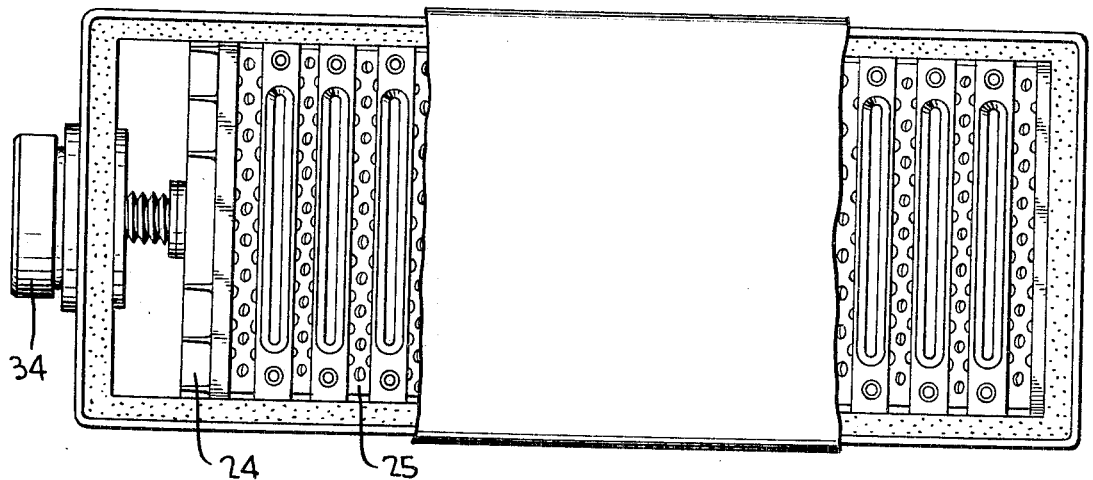
INVENTORS,
MARTIN G. ROSANSKY
BRUCE JAGID

3,513,030
METAL/AIR BATTERIES
Martin G. Rosansky, Forest Hills, and Bruce Jagid, Whitestone, N.Y., assignors to Leesona Corporation, Warwick, R.I., a corporation of Massachusetts
Filed Feb. 8, 1967, Ser. No. 614,685
Int. Cl. H01m 27/00
U.S. Cl. 136—86                                   10 Claims

ABSTRACT OF THE DISCLOSURE

A lightweight metal/air or metal/oxygen battery is described comprising a non-consumable envelope cathode comprising a hydrophobic membrane and a conductive catalytic coating on the inner surface of said membrane, a consumable replaceable metal anode positioned within the cathode and an electrolyte between the anode and cathode. The replaceable, consumable anode and non-consumable cathode are constructed and arranged to permit the anode to be plugged into the cathode. A redundant wiring system is set forth. By means of a screw mechanism and pressure plate, the pressure on the individual cells can be quickly applied and released, again facilitating the replacement of the anodes.

FIELD OF INVENTION

This invention embraces an improved air or oxygen depolarized cell for the electrochemical generation of electrical current. More particularly, the invention is directed to the improved construction of an air or oxygen depolarized cell of the type described completely in commonly assigned Oswin co-pending application Ser. No. 533,516, filed Mar. 11, 1966; and Oswin and Chodosh co-pending application Ser. No. 517603, filed Dec. 30, 1965. The improvements are directed primarily to the plug-in feature of the replaceable anode, the redundant wiring system and the means for retaining and releasing pressure on the cells to permit rapid removal and replacement of the anodes.

BACKGROUND OF INVENTION AND PRIOR ART

Air or oxygen depolarized cells of the type where only the anode of the cell is chemically changed or consumed during operation are known in the prior art. The first cells of this type, while being suitable for operations where only slow discharge was required, were not practical where rapid discharge was necessary. The cathodes of such cells were carbon structures making recharging impractical, if not impossible.

More recently, however, the metal/oxygen or metal/air systems as described by Oswin in the aforesaid co-pending application Ser. No. 533,516 have become increasingly attractive, particularly from the standpoint of obtaining a high energy to density ratio and rapid discharge and recharge. The ability to obtain the high discharge rate and recharging is primarily a result of the novel and highly efficient cathodes employed. However, in order to recharge such cells in situ it is necessary to have an available source of DC power. Particularly when the batteries are employed for propelling vehicles in the field, an external source of DC power is difficult, if not impossible, to obtain.

To overcome the aforesaid shortcoming, an air or oxygen depolarized cell having a mechanically replaceable anode was described in the aforesaid Oswin and Chodosh application Ser. No. 517,603. Although such batteries are satisfactory for most operations, more convenient and rapid replacement of the anodes is desirable.

OBJECTS AND BRIEF DESCRIPTION OF INVENTION

It is a primary object of the present invention to provide an air or oxygen depolarized cell having replaceable, plug-in anodes.

It is another object of this invention to provide a battery of air or oxygen depolarized cells having a redundant wiring system.

It is still another object of this invention to provide a battery of air or oxygen depolarized cells having a drive screw-pressure plate mechanism whereby the pressure on the individual cells can be quickly applied and released to facilitate anode replacements.

These and other objects of the invention will become more readily apparent from the following detailed description with particular emphasis being placed on the drawing.

The aforesaid objects of the present invention are obtained by utilizing a design whereby an anode having a negative terminal is inserted into an envelope cathode having a negative terminal jack. A second and positive lead is electrically connected to the cathode. A plurality of cells are connected in series or parallel depending upon the current and voltage requirements for a particular application. To facilitate positioning of the anode in the cathode, and as an operating insurance factor, a terminal and terminal jack are positioned on each end of the anode and envelope cathode. Additionally, lead wires emanating from the cathode are positioned on each side to provide two complete wiring systems for the battery of cells. As apparent, if the wiring on one side should become faulty for any reason a complete electrical circuit would still be maintained. To facilitate the replacement of the anodes in the plurality of cells, a pressure plate with a drive screw mechanism is positioned at one end of the battery of cells. Accordingly, the pressure on the cells can be applied and released with a minimum of effort.

The improvements in the battery construction in accordance with the present invention will be more readily apparent by reference to the drawing wherein like numerals are employed throughout to designate like parts.

THE DRAWING

In the drawing:
FIG. 1 is an exploded perspective view of one cell module;
FIG. 2 is a partial cutaway side view of a lightweight air or oxygen depolarized battery made up from a plurality of the cell modules of FIG. 1;
FIG. 3 is a plan view of the battery of FIG. 2 with the cover off and the anodes removed; and
FIG. 4 is a sectional view along line 4—4 of FIG. 2.

More specifically, FIG. 1 illustrates a cell module comprising an envelope cathode 10 made up of a non-conductive bi-cell frame 1.1 and reactive cathodes 1.2 and 1.3. The frame contains cell guide support 1.4 which facilitates the positioning of the cell module in the battery casing and moldings 1.5 which house positive leads 3.1 which are in electrical contact with the cathode. In the embodiment shown the cathode is made up of a continuous hydrophobic membrane 1.6, a conductive support screen 1.7, and an electro-catalyst layer 1.8 pressed into and around the support screen. The hydrophobic membrane is polytetrafluoroethylene and the electro-catalyst is a uniform mixture of platinum bonded with polytetrafluoroethylene particles. The catalyst and bonding agent are present at a weight ratio of ten parts to three parts.

Anode 2 comprising top portion 2.1 encapsulated onto metal body 2.2 fits into the envelope cathode and is locked into position by negative terminals 2.3 which fit into negative terminal jacks 1.4a. The terminals are in electrical contact with the anode body through the anode top. Handle 2.4 is employed to facilitate removal of the anode. Negative leads 3.2 emerge from the jack terminal at each side of the cell. The aforesaid together with the mirror cathode contacts, i.e., moldings 1.5 housing positive leads 3.1, provide a redundant wiring system. This system virtually eliminates any possibility of the battery becoming faulty because of loose or broken electrical connections. In the embodiment shown, the anode comprises a porous zinc body pressed around a conductive screen, not shown. Anode separator paper 2.5 completely surrounds the anode and serves as a matrix for retaining the cell electrolyte which is in this instance a solution of aqueous 31% potassium hydroxide. As is apparent, however, it is possible to employ a free-flowing electrolyte between the anode and cathode. Moreover, the electrolyte can be present as a "dry" alkali hydroxide in the anode, with the water being added at a later time.

A battery 20 made up of a plurality of the cell modules shown in FIG. 1 is illustrated in FIG. 2. The battery comprises casing 21, foam insert 22 which accommodates any shock which the battery may experience, fixed end plate 23, ribbed movable end plate 24, a plurality of cell modules 10, a plurality of inter-cell spacers 25, which are adjacent to the end plates and between each two cell modules, and drive screw mechanism 26. The inter-cell spacers, together with casing ports 27, allow for the necessary flow of air or oxygen for depolarizing the cells. The plurality of cells are electrically connected in series by interconnecting negative leads 3.2 and positive leads 3.1 designated generally by reference numeral 3a. The electrical leads are then taken to and through the top of the battery at positive contact 28 and negative contact 29. Cover 30 retained on casing 21 by clamps 31 complete the enclosure of the battery.

FIG. 3 gives a more complete view from the top of the envelope cathodes, without the anodes; and FIG. 4, a sectional view along line 4—4 of FIG. 2, illustrates the electrical contacts, vent ports 27 and the cell guide rails 32 within the battery casing.

After the battery is discharged initially, the cells are reactivated by replacing the spent anodes. The complete operation is conveniently accomplished as follows:

(1) the battery cover is removed;
(2) pressure on the plurality of cells is released by turning pressure control knob 34 counterclockwise;
(3) the spent anodes, which are now loose in the envelope cathodes, are removed and discarded;
(4) an anode, having electrolyte impregnated in the anode separator, is inserted into the envelope cathode;
(5) pressure control knob 34 is turned clockwise to re-apply pressure on the cells; and
(6) the battery cover is replaced.

The battery is now ready for operation.

Inasmuch as the cathodes are completely non-consumable, it is not necessary to service the cathodes at all. The electrolyte is replenished at the same time the anodes are inserted since the anode separator paper assembly is impregnated with electrolyte. As apparent, since the envelope cathodes are not moved substantially relative to the adjacent cathodes, the electrical leads are not disturbed. The entire recharging operation is extremely simple and can be accomplished virtually anywhere without need of an external power source. Accordingly, the battery is eminently suitable for mobile field operations.

The various components of the metal/air or metal/oxygen battery are described fully in the aforesaid commonly assigned Oswin co-pending application Ser. No. 533,516. Briefly, however, the cathodes employed comprise a hydrophobic membrane which is in contact with a conductive metal support screen or mesh and a catalytic layer. The membrane which is to be used can be any material which is hydrophobic and permits the passage of gas, but precludes the flow of aqueous materials. Exemplary materials are the polymers of fluorinated hydrocarbons such as polytetrafluoroethylene, polytrifluoroethylene, polyvinylfluoride, polyvinylidenefluoride, the hydrophobic co-polymers of two or more of the above materials or co-polymers of such materials with acrylonitrile, methacrylate, polyethylene, and the like. The polymers normally will have a porosity of from about 15 to 85 percent and a uniform pore size distribution of from about 0.01 to about 100 microns and a thickness of about 0.5 to 10 mils. The catalyst used to coat the hydrophobic polymer are the pure elements, alloys, oxides, or mixtures thereof which are effective in promoting an electrochemical reaction. More specifically, operable materials include the elements, alloys, oxides, or mixtures of Group I-B, II-B, IV, V, VI, VII, and VIII metals of the Mendelyeev's Periodic Table. The metal support screen can be any material which conducts an electrical current and will withstand the corrosive environment of the battery. Such materials include nickel, zirconium, titanium, and tungsten screens, expanded meshes, or the like. Moreover, it is possible to apply a hydrophilic polymer or other suitable hydrophilic material such as paper over the catalytic layer which will be in contact with the electrolyte of the battery when in operation.

The anodes which are to be used herein can be any conventional solid electro-conductor employed in a metal/air or metal/oxygen cell such as metals, metalloids, alloys, and heavy metal salts. It is only essential that the material selected be chemically reactive with a compatible electrolyte and be more electro-positive than oxygen. Such materials include lead, zinc, iron, cadmium, aluminum, and magnesium. From the standpoint of cost, capacity, and convenience, zinc is the preferred material. Although the anode can be in the form of a solid or substantially solid metal sheet, it is preferred that the anode be porous. Porous anodes can be made, for example, by sintering select metal powders.

The cells will operate on conventional electrolytes including the alkali materials such as sodium hydroxide, potassium hydroxide, mixtures of potassium or rubidium hydroxide, and the like. Acid electrolytes including sulfuric acid, phosphoric acid, and hydrochloric can be employed. As is apparent, depending upon the particular electrolyte used, different anode materials can be selected. It is also feasible and at times desirable to employ an electrolyte which is trapped in a sutiable matrix such as those made up of hydrophilic polymers, ceramic materials, and the like.

It should be appreciated that the instant invention is not to be construed as being limited by the illustrative embodiment. It is possible to produce still other embodiments without departing from the inventive concept herein disclosed. Such embodiments are within the ability of one skilled in the art.

It is claimed:

1. A metal/air or metal/oxygen electrochemical cell containing an envelope cathode comprising a non-conductive frame, a hydrophobic polymer member and a conductive catalytic coating on the inner surface of said member, a replaceable metal anode positioned within said envelope cathode and an electrolyte in the space separating the cathode and anode, said replaceable metal anode comprises a top portion which contains a terminal jack in electrical contact with the anode, the frame of said envelope cathode containing a conductive terminal jack receptacle, and said anode being plugged into said jack receptacle.

2. The metal/air or metal/oxygen electrochemical cell of claim 1 wherein the replaceable anode contains a terminal jack on each side of said top portion, and the frame of said envelope cathode contains a terminal jack receptacle on each side of said envelope cathode for receiving said terminal jacks from the anode, and said anode is plugged into said terminal jacks.

3. The metal/air or metal/oxygen electrochemical cell of claim 2 wherein the replaceable anode comprises a porous zinc body wrapped in a separator paper and the top portion is plastic encapsulated onto the zinc body and the electrolyte is impregnated in said zinc body and separator paper.

4. The metal/air or metal/oxygen electrochemical cell of claim 2 wherein the envelope cathode has an electrical contact at each side which is in electrical contact with said cathode.

5. A replaceable metal anode for an oxygen depolarized cell comprising a consumable metal body portion and a non-consumable and non-conductive top portion extending beyond the edges of said consumable metal body portion and said extended portion containing a plug-in type terminal jack in electrical contact with said consumable metal body portion.

6. The replaceable metal anode of claim 5 which contains a terminal jack in the extended top portion on each side of the anode which are electrically interconnected.

7. The replaceable anode of claim 6 wherein the metal anode comprises a porous zinc body wrapped in a separator paper and the top portion is encapsulated onto the zinc body and the zinc body and separator paper contain an electrolyte.

8. An improved metal/air or metal/oxygen battery comprising a plurality of electrochemical cells, each containing an envelope cathode comprising a non-conductive frame, a hydrophobic polymer member and a conductive catalytic coating on the inner surface of said member, said envelope cathode having an electrical contact at each side which is in electrical contact with said cathode and a conductive terminal jack receptacle having an electrical contact on each side of said frame, a replaceable metal anode positioned within said envelope cathode and comprising a consumable metal body portion and a top portion containing a terminal jack on each side, said terminal jacks of said anode being plugged into said terminal jack receptacles of said cathode frame and an electrolyte between said anode and cathode, inter-cell spacers between adjacent cells, said spacers having openings therein to permit access of air or oxygen to said envelope cathodes, and fixed end plates at each end of said plurality of cells, and a support for retaining said plurality of cells, said inter-cell spacers and said end plates in operable association.

9. The battery of claim 8 wherein the anode comprises a porous zinc body wrapped in a separator paper and the top portion is encapsulated onto the zinc body, said zinc body and separator paper containing an electrolyte.

10. The battery of claim 8 wherein one of the end plates is fixed and the second end plate is movable and in operable association with a screw drive mechanism for applying and releasing pressure on the plurality of cells.

References Cited

UNITED STATES PATENTS 3,378,406   4/1968   Rosansky _____ 136—86

WINSTON A. DOUGLAS, Primary Examiner

H. A. FEELEY, Assistant Examiner

U.S. Cl. X.R.

136—120